(12) United States Patent
Guetter et al.

(10) Patent No.: US 11,144,774 B2
(45) Date of Patent: Oct. 12, 2021

(54) AUTOMATED METHODS AND SYSTEMS FOR DETECTING CELLS IN STAINED SPECIMEN IMAGES

(71) Applicant: Ventana Medical Systems, Inc., Tucson, AZ (US)

(72) Inventors: Christoph Guetter, Alameda, CA (US); Kien Nguyen, Ho Chi Minh (VN); XiuZhong Wang, San Jose, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 72 days.

(21) Appl. No.: 16/779,294

(22) Filed: Jan. 31, 2020

(65) Prior Publication Data
US 2020/0167584 A1 May 28, 2020

Related U.S. Application Data

(63) Continuation of application No. PCT/EP2018/070923, filed on Aug. 2, 2018.
(Continued)

(51) Int. Cl.
*G06K 9/20* (2006.01)
*G06T 7/11* (2017.01)
(Continued)

(52) U.S. Cl.
CPC ......... *G06K 9/2018* (2013.01); *G06K 9/0014* (2013.01); *G06K 9/42* (2013.01);
(Continued)

(58) Field of Classification Search
CPC ...... G06K 9/2018; G06K 9/0014; G06K 9/42; G06K 9/4652; G06T 7/11; G06T 7/70;
(Continued)

(56) References Cited

U.S. PATENT DOCUMENTS

2011/0212486 A1* 9/2011 Yamada ............... G02B 21/365
435/40.5
2012/0163681 A1* 6/2012 Lohse ................ G01N 21/6428
382/128
(Continued)

FOREIGN PATENT DOCUMENTS

WO WO2012016242 A3 5/2012

OTHER PUBLICATIONS

Anonymous, Counterstain, Counterstain, Mar. 29, 2017, retrieved from the Internet: URL:https://en.wikipedia.org/w/index.php?title=Counterstain&oldid=772814635, the whole document.
(Continued)

*Primary Examiner* — Ali Bayat
(74) *Attorney, Agent, or Firm* — David Zamora

(57) ABSTRACT

A system and a method for unveiling poorly visible or lightly colored nuclei in an input image are disclosed. An input image is fed to a color deconvolution module for deconvolution into two color channels that are processed separately before being combined. The input image is deconvolved into two separate images: a stain image and a counter stain image. A complement of the stain image is generated in order to clearly reflect the locations of the poorly visible or light-colored nuclei. The complement image and the counter stain image are optionally normalized and then combined and segmented, to generate an output image with clearly defined nuclei. Alternatively, the complement of the stain image and the counter stain image can optionally be normalized, and then segmented prior to being combined to generate the output image.

20 Claims, 10 Drawing Sheets

Related U.S. Application Data

(60) Provisional application No. 62/541,630, filed on Aug. 4, 2017.

(51) Int. Cl.
    *G06T 7/70*     (2017.01)
    *G06K 9/00*     (2006.01)
    *G06K 9/42*     (2006.01)
    *G06K 9/46*     (2006.01)

(52) U.S. Cl.
    CPC .............. *G06K 9/4652* (2013.01); *G06T 7/11* (2017.01); *G06T 7/70* (2017.01); *G06T 2207/20212* (2013.01); *G06T 2207/30024* (2013.01)

(58) Field of Classification Search
    CPC . G06T 2207/20212; G06T 2207/30024; G06T 7/10; G06T 2207/10024
    USPC ......................................................... 382/133
    See application file for complete search history.

(56) References Cited

U.S. PATENT DOCUMENTS

| | | | |
|---|---|---|---|
| 2014/0185891 A1* | 7/2014 | Schoenmeyer | G06T 11/206 382/128 |
| 2016/0266126 A1* | 9/2016 | Shipitsin | G06T 7/136 |
| 2017/0076442 A1* | 3/2017 | Schoenmeyer | G16H 30/40 |
| 2020/0049599 A1* | 2/2020 | Alexander | G01N 1/36 |

OTHER PUBLICATIONS

Harsha et al., A hybrid approach for nucleus stain separation in histopathological images, A hybrid approach for nucleus stain separation in histopathological images, Jul. 11, 2017, p. 1220; 1219, 39th Annual Int. Conf.

International Search Report and Written Opinion, dated Feb. 1, 2019, in corresponding PCT/EP2018/070923, filed Aug. 2, 2018, pp. 1-22.

Najah Alsubaie, Stain Deconvolution Using Statistical Analysis of Multi-Resolution Stain Colour Representation, Stain Deconvolution Using Statistical Analysis of Multi-Resolution Stain Colour Representation, Jan. 11, 2017, 1-15, BR.

\* cited by examiner

AUTOMATED METHODS AND SYSTEMS FOR DETECTING CELLS IN STAINED SPECIMEN IMAGES

CROSS REFERENCES TO RELATED APPLICATIONS

The present application is a continuation of International Application PCT/EP2018/070923, entitled "Automated Methods And Systems For Detecting Cells In Stained Specimen Images" and filed Aug. 2, 2018, which claims priority to U.S. Provisional Application No. 62/541,630, filed Aug. 4, 2017. Each of these applications is hereby incorporated by reference in its entirety for all purposes.

BACKGROUND OF THE INVENTION

Field of the Disclosure

The present disclosure relates to digital image processing methods and systems for medical diagnosis. Particularly, the present disclosure relates to the automatic detection of cells in stained specimen images. More specifically, the present disclosure relates to the automatic detection of cells in stained specimen images.

Description of Related Art

In the analysis of biological specimens such as tissue sections, blood, cell cultures and the like, biological specimens are mounted on slides and stained with one or more combinations of stain and biomarkers, and the resulting assay is viewed or imaged for further analysis. An assay may include biological specimens such as tissue sections from human subjects that are treated with a stain containing a fluorophore or chromogen conjugated to an antibody which binds to protein, protein fragments, or other targets in the specimens. Observing the assay enables a variety of processes, including diagnosis of disease, assessment of response to treatment, and development of new drugs to fight diseases.

Upon scanning the assay, multiple information channels of image data including color channels are derived, with each observed channel comprising a mixture of multiple signals. One of the most common examples of assay staining is the Hematoxylin-Eosin (H&E) staining, which includes two stains that help identify tissue anatomy information. The H-stain mainly stains the cell nuclei with a generally blue color, while the E-stain acts mainly as a cytoplasmic generally pink stain. A special staining assay may identify target substances in the tissue based on their chemical character, biological character, or pathological character.

An immunohistochemistry (IHC) assay includes one or more stains conjugated to an antibody that binds to protein, protein fragments, or other structures of interest in the specimen, hereinafter referred to as targets or objects of interest. The antibodies and other compounds (or substances) that bind a target in the specimen to a stain, are referred to herein as biomarkers.

For an H&E or a special staining assay, biomarkers have a fixed relationship to a stain (e.g., Hematoxylin counter-stain), whereas for an IHC assay, a choice of stain may be used for a biomarker to develop and create a new assay. Biological specimens are prepared according to an assay before imaging. Upon applying a single light source, a series of multiple light sources, or any other source of input spectra to the tissue, the assay can be assessed by an observer, typically through a microscope, or image data can be acquired from the assay for further processing.

In such an acquisition, multiple information channels of image data, for example color channels, are derived, with each observed channel comprising a mixture of multiple signals. Processing of this image data can include methods of color deconvolution also referred to as spectral unmixing, color separation, etc., that are used to determine a local concentration of specific stains from the observed channel or channels of image data. For image data processed by automated methods, depicted on a display, or for an assay viewed by an observer, a relation may be determined between the local appearance of the stained tissue and the applied stains and biomarkers to determine a model of the biomarker distribution in the stained tissue.

An important area in digital image analysis in the healthcare field is the ability to identify and quantify staining for analytes of interest in specific subcellular locations. Algorithms for doing such analyses currently exist. For example, algorithms are currently known for detecting membrane expression of HER2 and cMET. These algorithms rely on nuclei detection to search for stained membrane on a local neighborhood around nuclei, using a predefined threshold to define the neighborhood around the nuclei to be searched for membrane regions. Hence, if these algorithms miss the nuclei or if the membrane lies outside the predefined neighborhood radius, stained membrane around them might not be detected. Additionally, the algorithms might ignore regions that contain membrane staining in combination with other staining compartments (such as cytoplasmic staining). Thus, quantification of staining using these methods could be incomplete or incorrect.

Multiple approaches to nucleus detection have been presented in the art. Exemplary approaches include the application of a detection (or segmentation) method such as a radial symmetry-based method, or a watershed transform method on the counter stain image channel (e.g., Hematoxylin), that are described in the following representative publications:

- B. Parvin, et al., "Iterative voting for inference of structural saliency and characterization of subcellular events," IEEE Transactions on Image Processing, vol. 16, pp. 615-623, 2007.
- J. M. Sharif, M. F. Miswan, M. A Ngadi, M. S. H. Salam and M. M. bin Abdul Jamil, "Red blood cell segmentation using masking and watershed algorithm: A preliminary study," Biomedical Engineering (ICoBE), 2012 International Conference on, Penang, 2012, pp. 258-262.

However, certain cell surface receptors may demonstrate both membrane staining (where the cell surface receptors may function as ligand receptors), cytoplasmic staining (where the cell surface receptors may exert some effector functions), and nuclear staining. In each of these cases, the detection of the nuclei may depend upon the staining colors and whether these staining colors are mutually exclusive. As a result, applying the counter stain image channel (e.g., hematoxylin) usually fails in the regions where the cell membrane is strongly stained, while the counter stain is very faint if even present. More specifically, a darker, brown-colored, membranous DAB stain may obscure the underlying lighter, blue-colored nuclear H-stain. Thus, the reliability of conventional approaches begins to degrade as different staining colors begin to intermingle with one another.

Consequently, prior to the advent of the present disclosure, the conventional approaches could result in misprognosis and/or missed opportunity for selection of an effective treatment for several patients.

BRIEF SUMMARY OF THE DISCLOSURE

The present disclosure addresses the foregoing concern by providing, inter alia, a digital image processing system and method for the automatic detection of cells in intermixed, stained specimen images, particularly in stain images. More specifically, the present digital image processing system includes a digital storage medium that stores digitally encoded, non-transitory computer-readable instructions for execution by one or more processors, in order to implement the method of the present disclosure.

The present disclosure describes a method for unveiling undetected or undetectable nuclei, such as poorly visible nuclei and/or lightly colored nuclei in an input image, and particularly in a histochemical stain region (or area of interest), such as analytically distinct staining patterns that may include for example, membrane, cytoplasmic, or punctate patterns.

In one embodiment, an input image is fed to a color deconvolution module for deconvolution into two information channels, such as color channels, that are processed separately. A color deconvolution module generates two separate images from the input image: a stain image and a counter stain image. In this exemplary illustration, the cell detection engine aims at detecting nuclei in stain image as well as in counter stain image.

A stain image complement module is adapted to automatically generate a binary complement of the stain image in order to clearly detect the previously masked, light-colored nuclei. A normalization module is adapted to normalize the complement image of the stain image.

Cell detection, which includes an automated process of a computer to identify the location of a particular cell in an image, may be performed in multiple ways. While the present disclosure describes two exemplary, alternative embodiments to implement cell detection, it should be clear that other embodiments may be derived therefrom and are contemplated by the present disclosure.

According to one embodiment, the normalization module may be adapted to normalize the counter stained cell nuclei image into a normalized counter stain image. Thereafter, an image operator module may combine the normalized complement of the stain image and the normalized counter stain image in order to generate a combined normalized image. A segmentation module may then automatically extract the individual cells in the combined normalized image.

According to another embodiment, the input image is fed to the color deconvolution module for deconvolution into two color channels that are processed separately, in order to generate two separate images from the input image: a brown (e.g., membrane-stained tissue) image and a blue (e.g., counter stain) image. A stain image complement module is adapted to automatically generate a binary complement of stain image. A segmentation module may then automatically detect all the cells from the binary complement stain image. A nuclei segmentation module segments all nuclei (e.g., blue ellipses in blue image channel) from the counter stain image. An object operator module then combines the cell detection results from both images into the final cell detection output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various features of the present disclosure and the manner of attaining them will be described in greater detail with reference to the following description, claims, and drawings wherein:

Figure 1:
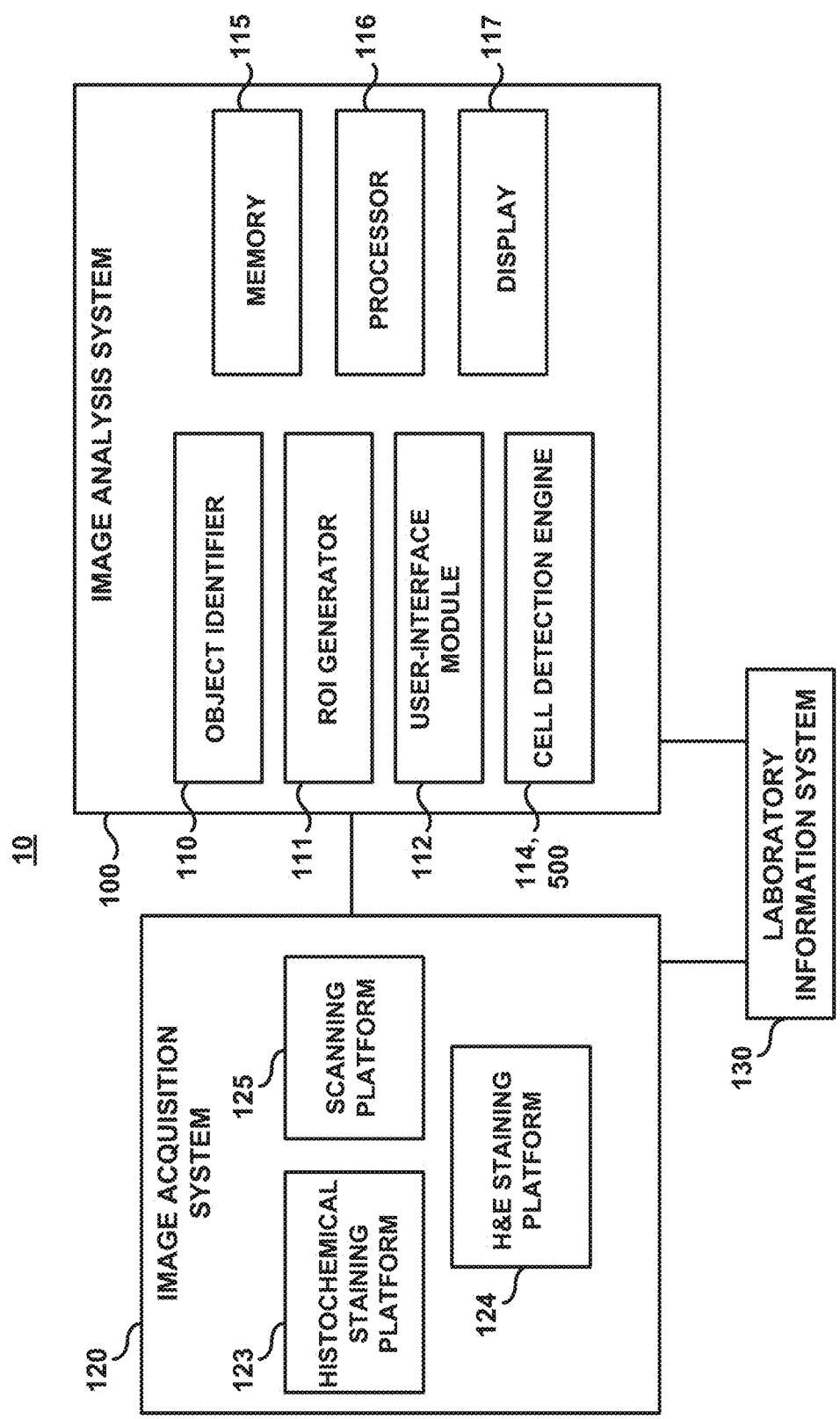
FIG. 1 depicts a computer-based cellular detection system that is adapted to automatically detect the presence of cells in stained specimen images, and more particularly to automatically detect cells in stain images, in accordance with an exemplary embodiment of the subject disclosure.

It will be appreciated that for simplicity and clarity of illustration, reference numbers may be reused among the figures to indicate corresponding or analogous features.

DETAILED DESCRIPTION OF THE DISCLOSURE

Unless defined otherwise, technical and scientific terms used herein have the same meaning as commonly understood by a person of ordinary skill in the art. See, e.g., Lackie, DICTIONARY OF CELL AND MOLECULAR BIOLOGY, Elsevier (4th ed. 2007); Sambrook et al., MOLECULAR CLONING, A LABORATORY MANUAL, Cold Springs Harbor Press (Cold Springs Harbor, N.Y. 1989).

Analytically Distinct Staining Patterns:

Two or more different spatial relationships of the same analyte or group of analytes that convey different biological meanings. For example, transcription factors can be localized either to the cytoplasm (in which case they are likely to be inactive) or to the nucleus (in which case they are likely activated). Thus, a "cytoplasmic" staining pattern and a "nuclear" staining pattern are analytically distinct. Similarly, certain cell surface receptors can have staining patterns showing localized to the membrane, or localized to the cytoplasm. The relevant activity of the receptor may be different depending on where the receptor is localized. Thus, in this example, a "membrane" staining pattern is analytically distinct from a "cytoplasmic" staining pattern. In other cases, however, the localization of a particular analyte may not be important. For example, an immunohistochemical assay for the particular localization of phosphorylation signal of a receptor tyrosine kinase likely would not be analytically relevant.

Antibody:

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

Biomarker:

As used herein, the term "biomarker" shall refer to any molecule or group of molecules found in a biological sample that can be used to characterize the biological sample or a subject from which the biological sample is obtained. For example, a biomarker may be a molecule or group of molecules whose presence, absence, or relative abundance is:

characteristic of a particular cell or tissue type or state;
characteristic of a particular pathological condition or state; or
indicative of the severity of a pathological condition, the likelihood of progression or regression of the pathological condition, and/or the likelihood that the pathological condition will respond to a particular treatment.

As another example, the biomarker may be a cell type or a microorganism (such as a bacteria, mycobacteria, fungi, viruses, and the like), or a substituent molecule or group of molecules thereof.

Biomarker-Specific Reagent:

A specific detection reagent that is capable of specifically binding directly to one or more biomarkers in the cellular sample, such as a primary antibody.

Cell Detection:

Automated process of a computer to identify the location of a particular cell in an image for all the cells present in the image.

Cellular Sample:

As used herein, the term "cellular sample" refers to any sample containing intact cells, such as cell cultures, bodily fluid samples or surgical specimens taken for pathological, histological, or cytological interpretation. A biological sample can be a tissue or a cell sample. The source of the tissue or cell sample may be solid tissue as from a fresh, frozen and/or preserved organ or tissue sample or biopsy or aspirate; blood or any blood constituents; bodily fluids such as cerebral spinal fluid, amniotic fluid, peritoneal fluid, or interstitial fluid; cells from any time in gestation or development of the subject. The cellular sample can also be obtained from in vitro tissue or cell culture. The cellular sample may contain compounds which are not naturally intermixed with the cells in nature such as preservatives, anticoagulants, buffers, fixatives, nutrients, antibiotics, or the like. Examples of cellular samples herein include, but are not limited to, tumor biopsies, circulating tumor cells, serum or plasma, primary cell cultures or cell lines derived from tumors or exhibiting tumor-like properties, as well as preserved tumor samples, such as formalin-fixed, paraffin-embedded tumor samples or frozen tumor samples.

Complement Image:

In the complement of a binary image, zeros become ones and ones become zeros; darker colors (e.g., black or brown) and lighter colors (e.g., white or blue) are reversed. As a result, in the complement image, darker areas become lighter and lighter areas become darker.

Computer Program:

Also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks, magneto-optical disks; and CD- ROM and DVD-ROM disks. The processor and the memory can be supplemented by, or incorporated in, special purpose logic circuitry.

Computing System:

Also referred to as computer, includes any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Counterstain:

A stain with color contrasting to the principal stain, making the stained object more readily detectable. For example, eosin counterstain to hematoxylin in an H&E stain.

Cytoplasmic Staining:

A group of pixels arranged in a pattern bearing the morphological characteristics of a cytoplasmic region of a cell.

Marker:

A stain, dye, or a tag that allows a biomarker to be differentiated from ambient tissue and/or from other biomarkers. The term "biomarker" may be understood in the sense of a tissue feature, such as the presence of a particular cell type, for instance immune cells, and more particularly, a tissue feature indicative of a medical condition. The biomarker may be identifiable by the presence of a particular molecule, for instance a protein, in the tissue feature.

Membrane/Cytoplasmic Region:

A region in which diffuse membrane staining is intermixed with cytoplasmic staining.

Membrane/Punctate Region:

A region in which diffuse membrane staining is intermixed with punctate staining.

Normalized Feature Metric:

A feature metric, the value of which has been adjusted by a normalization factor.

Object Segmentation:

An object isolation process in which an object of interest (e.g., a cell, tumor, or bone, etc.) is separated from a background of varying, for example, the optical complexity. Conventional image segmentation techniques can be broadly divided into three categories:
1. Edge- or contour-based approaches, in which sustained intensity changes, or edges, are marked (usually with a discrete derivative operator).
2. Direct region segmentation approaches, in which the image is partitioned according to some homogeneity criterion.
3. Gray-level thresholding, where bright (or dark) objects are separated from the background by the use of an appropriate threshold value.

Processor:

Encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Punctate Staining:

A group of pixels with strong localized intensity of staining appearing as spots/dots scattering on the membrane area of the cell.

Sample:

As used herein, the term "sample" shall refer to any material obtained from an object or target capable of being tested for the presence or absence of a biomarker.

Stain:

When used as a noun, the term "stain" shall refer to any substance that can be used to visualize specific molecules or structures in a cellular sample for microscopic analysis, including brightfield microscopy, fluorescent microscopy, electron microscopy, and the like. When used as a verb, the term "stain" shall refer to any process that results in deposition of a stain on a cellular sample.

Subject:

When used as a noun, the term "subject" or "individual" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

Test Sample:

A tumor sample obtained from a subject having an unknown outcome at the time the sample is obtained.

Tissue Sample:

As used herein, the term "tissue sample" shall refer to a cellular sample that preserves the cross-sectional spatial relationship between the cells as they existed within the subject from which the sample was obtained. "Tissue sample" shall encompass both primary tissue samples (i.e. cells and tissues produced by the subject) and xenografts (i.e. foreign cellular samples implanted into a subject).

Tissue Specimen:

Encompasses any type of biological specimen such as tissue sections, blood, cell cultures, and like biological samples, that can be mounted on a slide.

User Interface Devices:

Include a display which provides for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

With reference to FIG. 1, a cellular detection system 10 is provided according to an exemplary embodiment of the present disclosure. The cellular detection system 10 may be adapted to automatically detect the presence of cells in stained specimen images and more particularly, to automatically detect cells in darker colored stain images. The cellular detection system 10 generally includes an image analysis system 100 and an image acquisition system 120.

One or more digital images of a stained biological sample are acquired by an image acquisition system 120. Essentially, any suitable imaging method capable of generating a color digital image can be used. For example, an R, G, B input color image 210 (FIG. 2) of the stained tissue sample (tissue specimen or cellular sample) can be generated and stored in a storage device, such as a local computer, disc drive, solid state drive, a server machine, or the like.

Image analysis system 100 may include one or more computing devices such as desktop computers, laptop computers, tablets, smartphones, servers, application-specific computing devices, or any other type(s) of electronic device (s) capable of performing the techniques and operations described herein. In some embodiments, image analysis system 100 may be implemented as a single device. In other embodiments, image analysis system 100 may be implemented as a combination of two or more devices together achieving the various functionalities described herein. For example, image analysis system 100 may include one or more server computers and one or more client computers communicatively coupled to each other via one or more local-area networks and/or wide-area networks such as the Internet or Intranet.

Figure 2:
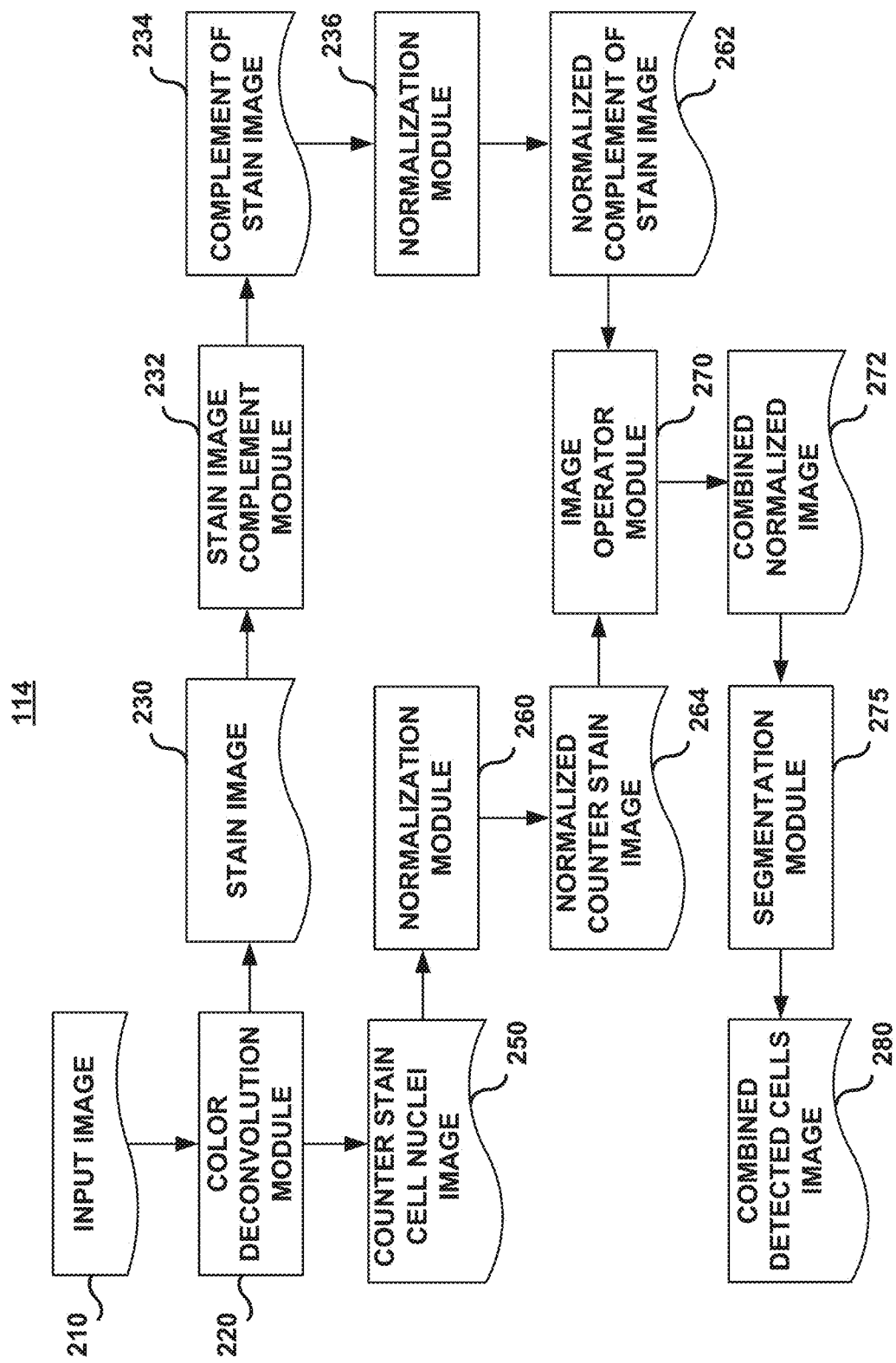
FIG. 2 is a block diagram of a cell detection engine that forms part of the cellular detection system of FIG. 1, in accordance with an exemplary embodiment of the subject disclosure.

Image analysis system 100 may include a memory 115, a processor 116, and a display 117. Memory 115 may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. Memory 115 may store non-transitory computer-readable instructions for processor 116 to execute the workflows of the present disclosure at it will be described later in more detail. For brevity purposes, memory 115 is depicted in FIG. 2 as a single device, but it is appreciated that memory 115 can also be distributed across two or more devices.

Processor 116 may include one or more processors of any type, such as central processing units (CPUs), graphics processing units (GPUs), special-purpose signal or image processors, field-programmable gate arrays (FPGAs), tensor processing units (TPUs), and so forth. For brevity purposes, processor 116 is depicted in FIG. 2 as a single device, but it is appreciated that processor 116 can also be distributed across any number of devices.

Display 117 may be implemented using any suitable technology, such as LCD, LED, OLED, TFT, Plasma, etc. In some implementations, display 117 may be a touch-sensitive display (a touchscreen).

Image analysis system 100 may also include an object identifier 110, a region of interest (ROI) generator 111, a user-interface module 112, and a cell detection engine 114. While these modules are depicted in FIG. 1 as standalone modules, it will be evident to persons having ordinary skill in the art that each module may instead be implemented as a number of sub-modules, and that in some embodiments any two or more modules can be combined into a single module. Furthermore, in some embodiments, system 100 may include additional engines and modules (e.g., input devices, networking and communication modules, etc.) not depicted in FIG. 1 for brevity. Furthermore, in some embodiments, some of the blocks depicted in FIG. 1 may be disabled or omitted. As it will be discussed in more detail below, the functionality of some or all the modules of system 100 can be implemented in hardware, software, firmware, or as any combination thereof. Exemplary commercially-available software packages useful in implementing modules as disclosed herein include VENTANA VIRTUOSO; Definiens TISSUE STUDIO, DEVELOPER XD, and IMAGE MINER; and Visopharm BIOTOPIX, ONCOTOPIX, and STEREOTOPIX software packages.

After acquiring image 210, image analysis system 100 may pass the image 210 to an object identifier 110, which functions to identify and mark relevant objects and other features within image 210 that will later be used for cell detection. Object identifier 110 may extract from (or generate for) each image 210 a plurality of image features characterizing the various objects in the image as a well as pixels representing expression of the biomarker(s). The extracted image features may include, for example, texture features such as Haralick features, bag-of-words features and the like. The values of the plurality of image features may be combined into a high-dimensional vector, hereinafter referred to as the "feature vector" characterizing the expression of the biomarker. For example, if M features are extracted for each object and/or pixel, each object and/or pixel can be characterized by an M-dimensional feature vector. The output of object identifier 110 is effectively a map of the image annotating the position of objects and pixels of interest and associating those objects and pixels with a feature vector describing the object or pixels. It should be understood that the feature vector is described herein for purposes of illustration and that the present disclosure is not limited to biomarkers.

For biomarkers that are scored on the basis of the biomarker's association with a particular type of object (such as membranes, nuclei, cells, etc.), the features extracted by object identifier 110 may include features or feature vectors sufficient to categorize the objects in the sample as biomarker-positive objects of interest (as denoted by the red arrow arrow 810 in FIG. 8) or biomarker-negative objects of interest (as denoted by the blue arrow arrow 820 in FIG. 8) and/or by level or intensity of biomarker staining of the object. In cases where the biomarker may be weighted differently depending on the object type that is expressing it (such as immune-checkpoint biomarkers such as PD-L1, PD-L2, and IDO, which can be scored on the basis of tumor cell expression, immune cell expression, or both), the features extracted by object identifier 110 may include features relevant to determining the type of objects associated with biomarker-positive pixels. Thus, the objects may then be categorized at least on the basis of biomarker expression (for example, biomarker-positive or biomarker-negative cells) and, if relevant, a sub-type of the object (e.g. tumor cell, immune cell, etc.). In cases where extent of biomarker-expression is scored regardless of association with objects, the features extracted by object identifier 110 may include for example location and/or intensity of biomarker-positive pixels.

Image analysis system 100 may also pass the image to ROI generator 111. ROI generator 111 may be used to identify the region(s) of interest, ROI or ROIs, of the image 210 from which an immune context score may be calculated. In cases where the object identifier 110 is not applied to the whole image, the ROI or ROIs generated by the ROI generator 111 may also be used to define a subset of the image on which object identifier 110 is executed. In one embodiment, ROI generator 111 may be accessed through user-interface module 112. An image of the biomarker-stained sample (or a morphologically-stained serial section of the biomarker-stained sample) is displayed on a graphic user interface of the user interface module 112, and the user annotates one or more region(s) in the image to be considered ROIs. ROI annotation can take a number of forms in this example. For example, the user may manually define the ROI (referred to hereafter as "freeform ROI annotation").

In other examples, the ROI generator 111 may assist the user in annotating the ROI. For example, the user may annotate an edge in the image (such as, for example, a leading edge of an invasive margin of a tumor, or an edge denoting a transition from tumor core to invasive region of a tumor), and ROI generator 111 may automatically define an ROI based on the user-defined edge. For example, the user may annotate the leading edge of the invasive margin in user interface module 112, and the ROI generator 111 creates an ROI using the edge as a guide, for example, by drawing an ROI encompassing all objects within a pre-defined distance of the edge or within a predefined distance of one side of the edge. In some cases, the user may be given an option to modify the ROI annotated by ROI generator 111, such as by expanding the ROI, annotating regions of the ROI or objects within the ROI to be excluded from analysis, etc. In other embodiments, ROI generator 111 may automatically suggest an ROI without any direct input from the user (for example, by applying a specimen segmentation function to an unannotated image), which the user may then chose to accept, reject, or edit as appropriate. In some embodiments, ROI generator 111 may also include a registration function, whereby an ROI annotated in one section of a set of serial sections is automatically transferred to other sections of the set of serial sections. This functionality is especially useful when there are multiple biomarkers being analyzed, or when an H&E-stained serial section is provided along with the biomarker-labeled sections.

After both the object identifier 110 and ROI generator 111 have been implemented, the cell detection engine 114 is implemented, as it will be described later in more detail.

In some embodiments, image analysis system 100 may be communicatively coupled to image acquisition system 120. Image acquisition system 120 may obtain images of biological specimens and provide those images 210 to image analysis system 100 for analysis and presentation to the user.

Image acquisition system 120 may include a scanning platform 125 such as a slide scanner that can scan the stained slides at 20×, 40×, or other magnifications to produce high resolution whole-slide digital images, including for example slide scanners. At a basic level, the typical slide scanner includes at least: (1) a microscope with lens objectives, (2) a light source (such as halogen, light emitting diode, white light, and/or multispectral light sources, depending on the dye), (3) robotics to move glass slides around (or to move the optics around the slide), (4) one or more digital cameras for image capture, (5) a computer and associated software to control the robotics and to manipulate, manage, and view digital slides. Digital data at a number of different X-Y locations (and in some cases, at multiple Z planes) on the slide are captured by the camera's charge-coupled device (CCD), and the images are joined together to form a composite image of the entire scanned surface. The following are exemplary methods to accomplish this task:

(1) Tile based scanning, in which the slide stage or the optics are moved in very small increments to capture square image frames, which overlap adjacent squares to a slight degree. The captured squares are then automatically matched to one another to build the composite image; and (2) Line-based scanning, in which the slide stage moves in a single axis during acquisition to capture a number of composite image "strips." The image strips can then be matched with one another to form the larger composite image.

Images generated by scanning platform 125 may be transferred to image analysis system 100 or to a server or database accessible by image analysis system 100. In some embodiments, the images may be transferred automatically via one or more local-area networks and/or wide-area networks. In some embodiments, image analysis system 100 may be integrated with or included in scanning platform 125 and/or other modules of image acquisition system 120, in which case the image may be transferred to image analysis system, e.g., through a memory accessible by both platform 125 and system 120.

In some embodiments, image acquisition system 120 may not be communicatively coupled to image analysis system 100, in which case the images may be stored on a non-volatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by histochemical staining platform 123, and where the slide may have been scanned by a slide scanner or another type of scanning platform 125. It is appreciated, however, that in other embodiments, below-described techniques may also be applied to images of biological samples acquired and/or stained through other means.

Cellular detection system 10 may also include an automated histochemical staining platform 123, such as an automated IHC/ISH slide stainer, and an H&E staining platform 124.

Figure 3:
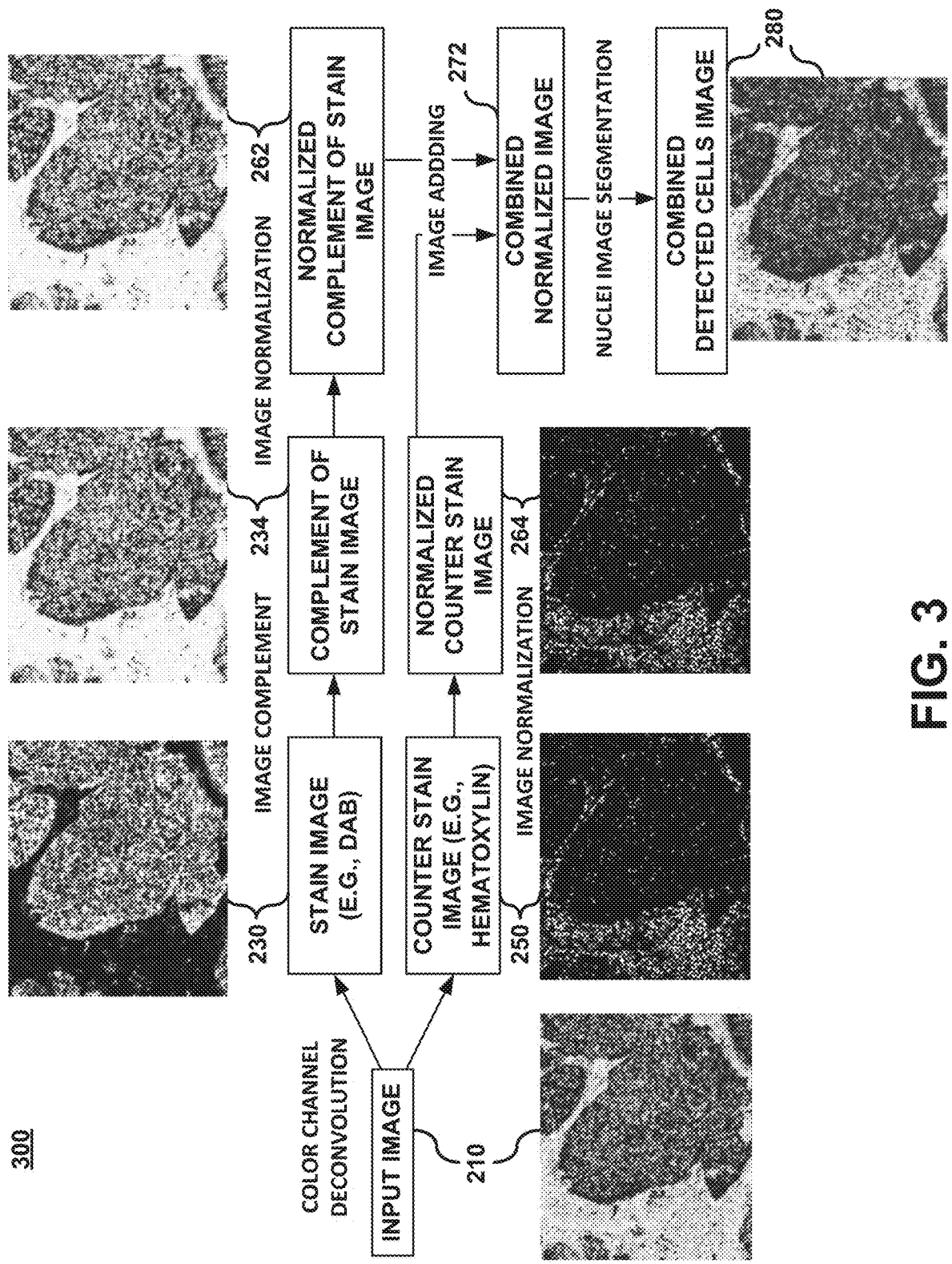
FIG. 3 depicts a workflow implemented by the cell detection engine of FIG. 2, wherein the images generated by the cell detection engine are normalized, combined, and then segmented, in accordance with an exemplary embodiment of the subject disclosure.
Figure 4:
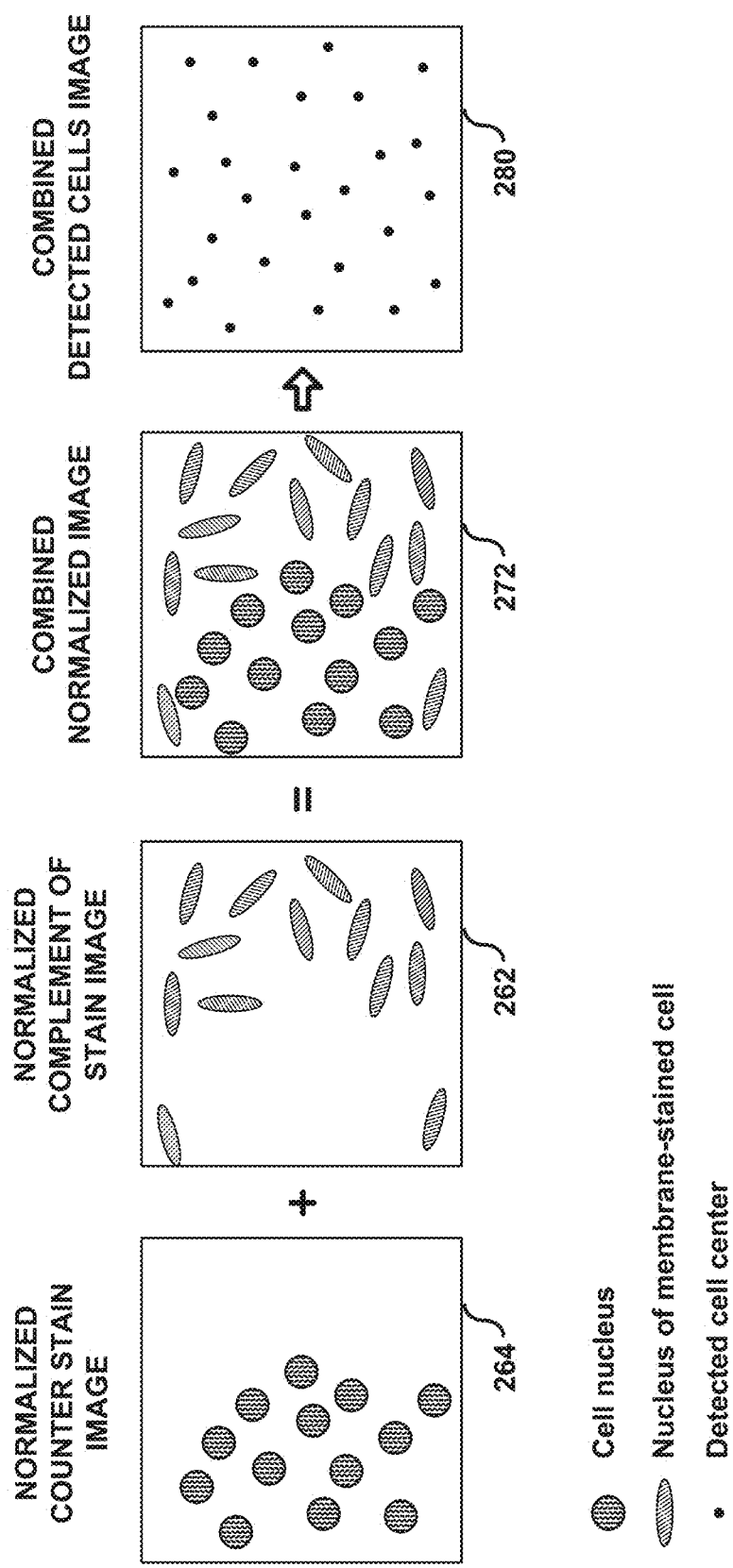
FIG. 4 depicts schematic illustrations of cellular distributions in a counter stain image and a complement of a membrane stain image shown in FIGS. 2 and 3, in accordance with an exemplary embodiment of the subject disclosure.

With further reference to FIGS. 2, 3, and 4, FIG. 2 illustrates a cell detection engine 114 that forms part of image analysis system 100. FIG. 3 illustrates a workflow 300 implemented by cell detection engine 114, wherein cell detection (or segmentation) is performed after the images have been deconvolved (deconvoluted), individually complemented, optionally normalized, and then recombined. FIG. 4 depicts exemplary schematic illustrations of cellular distributions as implemented by workflow 300.

Figure 8:
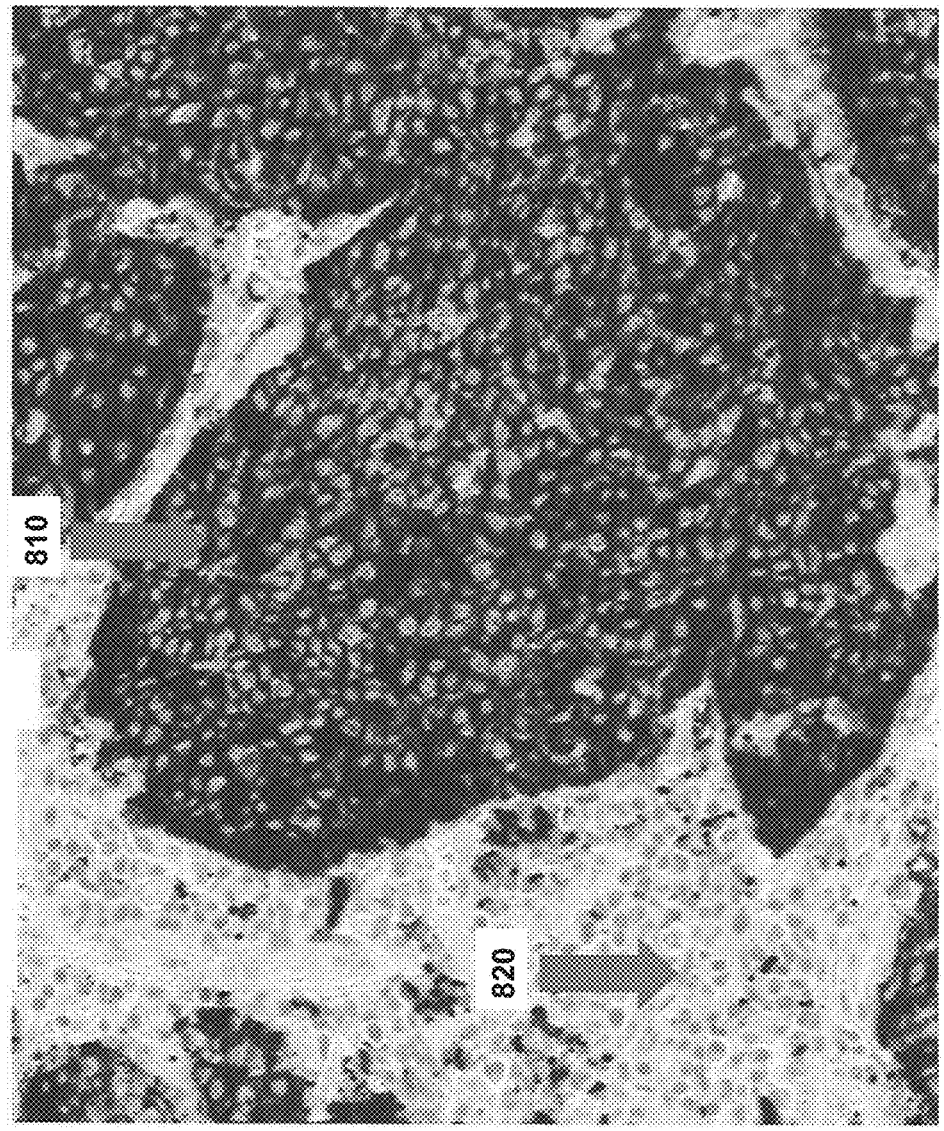
FIG. 8 depicts a rendition of a PDL1 stained specimen image that includes two distinctly stained regions of interest that contain cells to be detected by the cell detection engine, in accordance with an exemplary embodiment of the subject disclosure.
Figure 9:
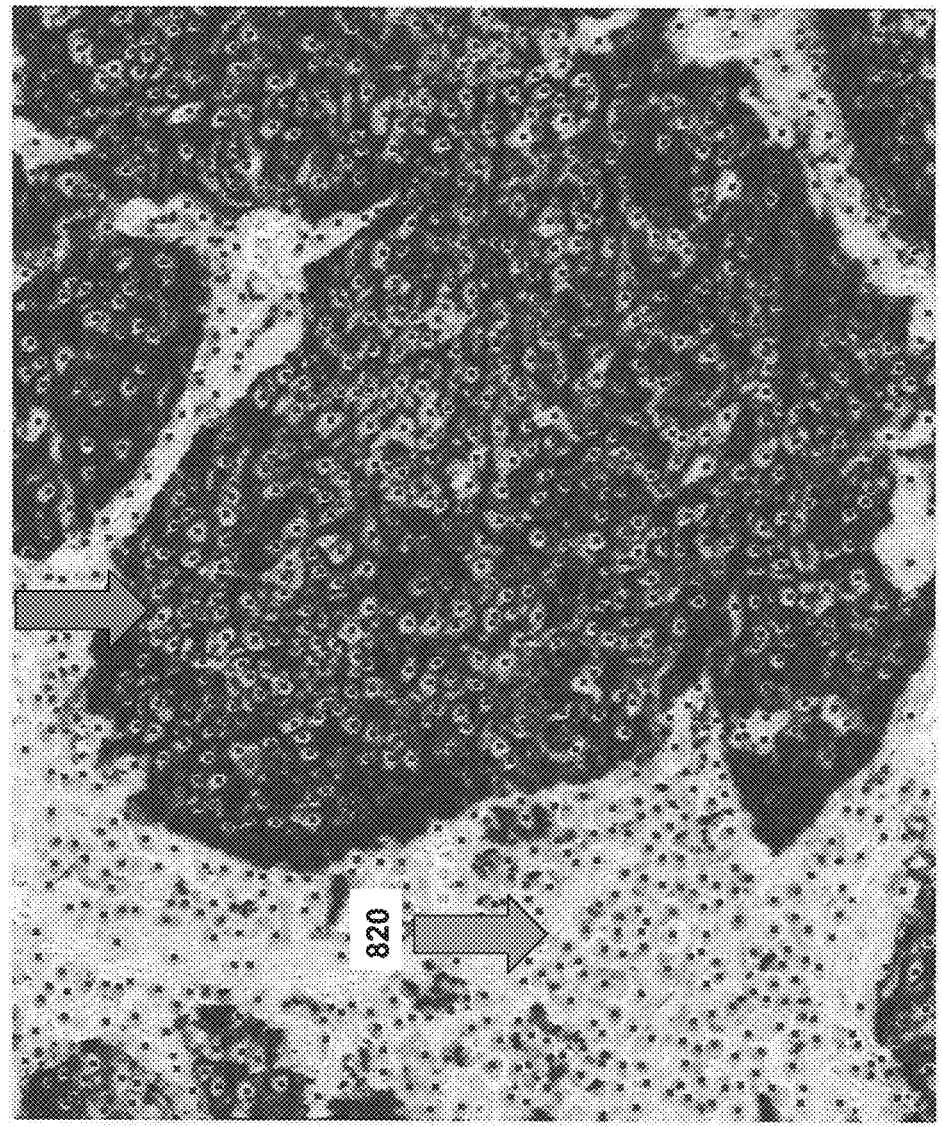
FIG. 9 depicts an output rendition of the PDL1 stained specimen image of FIG. 8, resulting from the execution of the cell detection workflow shown in either FIG. 3 or FIG. 6, in accordance with an exemplary embodiment of the subject disclosure.

In this particular illustration and with further reference to FIG. 8, input image 210 is a PDL1 stained specimen image that includes at least two distinctly stained regions of interest (or groups of regions of interest) ROIs. A first ROI includes a positive region and is denoted by the red arrow 810, and a second ROI includes a negative region and is denoted by the blue arrow 820, wherein nuclei need to be detected in both ROIs 810, 820.

To this end, ROI 810 represents an exemplary specimen image where the cell membrane is stained by 3,3'-diaminobenzidine (DAB), which produces dark (or darker) colored staining, such as brown, purple, or any other relatively dark color, wherever the enzymes are bound. In addition, the reaction with DAB can be enhanced using nickel to produce a deep purple/black staining. Various factors, including dark color staining may mask the underlying lighter colored stained nuclei and render them undetectable. ROI 820 represents a specimen image where the cell nuclei may have been counter-stained by Hematoxylin.

Figure 10:
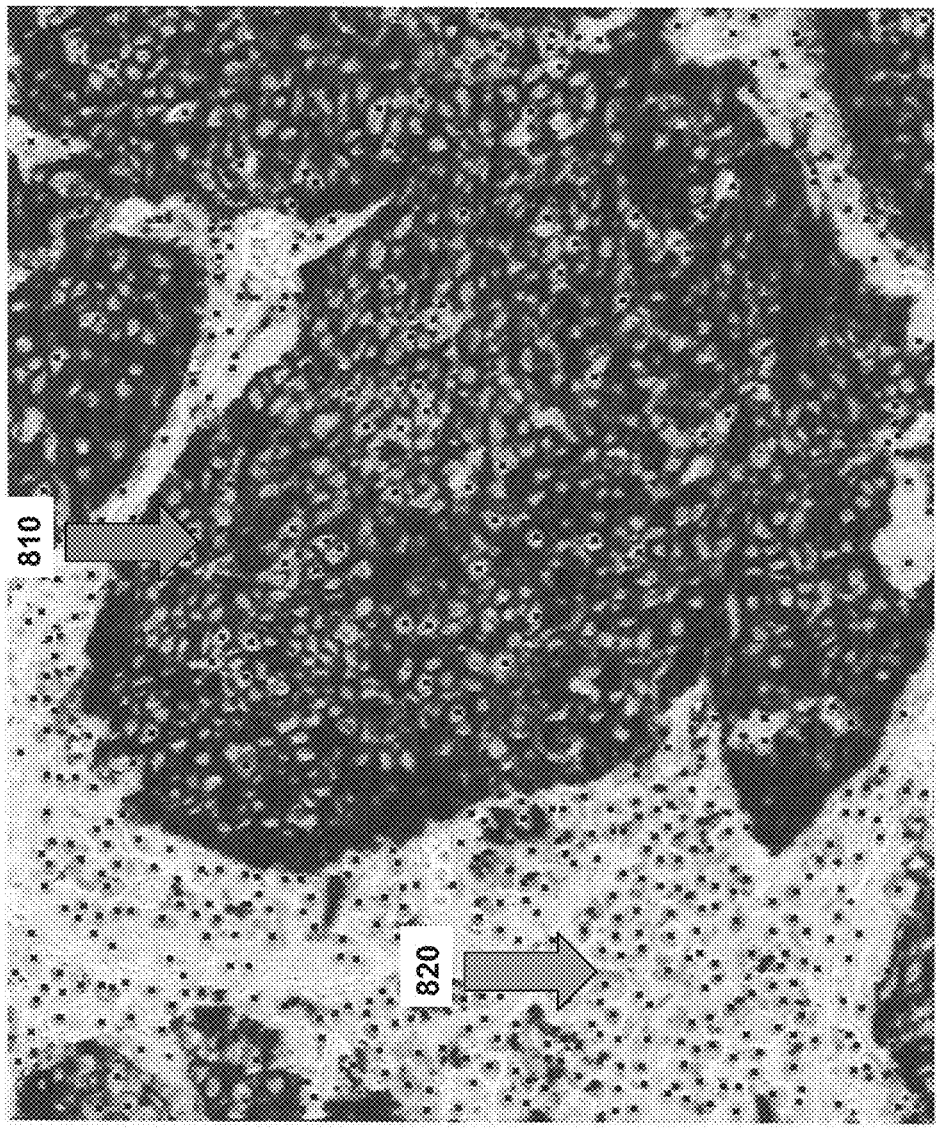
FIG. 10 depicts an output rendition of the PDL1 stained specimen image of FIG. 8, resulting from the execution of a conventional cell detection algorithm using radial symmetry, which is applied on counter stain Hematoxylin (blue channel).

FIG. 10 represents a rendition 1000 of input image 210 resulting from the execution of a cell detection algorithm that only focuses on the blue color channel using, for example, a radial symmetry algorithm. While the output image 1000 resulting from this conventional method shows certain improvement over input image 210, there is still room for additional improvements particularly that the DAB, strong (or dark) membrane staining region 810 still does not clearly portray the underlying and still masked, lighter colored nuclei.

The present disclosure describes methods for unveiling the masked nuclei in input image 210, and particularly in the DAB region 810. To this end, input image 210 is fed to a color deconvolution (or color unmixing) module 220, for deconvolution into two color channels that are processed separately before being combined. Color deconvolution module 220 generates two separate images from input image 210: a stain image 230 and a counter stain image 250. In this exemplary illustration, cell detection engine 114 aims mainly at detecting nuclei in stain image 230 as well as in counter stain image 250.

The images generated by color deconvolution module 220 are then individually transformed into binary images by means of simple or sophisticated segmentation into foreground and background. For example, in this exemplary illustration, the foreground is composed of all areas in the image that are covered by a brown DAB stain. A stain image complement module 232 is adapted to automatically generate a binary complement 234 of stain image 230. In the complement of a binary image, zeros become ones and ones become zeros, leading to the reversal of color. As a result, the complement image 234 clearly reflects the previously masked light-colored nuclei.

A normalization module 260 (FIG. 2) is adapted to normalize the complement image 234 of the stain image 230, in order to generate a normalized complement 262 (FIGS. 3, 4). In some embodiments, the normalized feature metric may be a total metric. In other embodiments, the normalized feature metric may be a mean or median of the normalized feature metric for a plurality of control regions of the ROI.

A normalization module 236 may optionally be implemented onto the complement image 234 to generate a normalized complement 262 of membrane stain image 230. Another (or the same) normalization module 260 may optionally normalize the counter stained cell nuclei image 250 into a normalized counter stain image 264. Thereafter, an image operator module 270 (FIG. 2) is adapted to combine the normalized complement 262 of the stain image 230 and the normalized binary image of the counter stain image 264, to generate a combined normalized image 272. A segmentation module 275 (FIG. 2) of cell detection engine 114 then detects the nuclei within the combined, normalized image 272, and outputs a combined detected cells image 280 (FIGS. 2, 3, 4, 9). A comparison of the output image 280 of FIG. 9 and the output image 1000 of the prior art clarifies that the present disclosure provides a superior nuclei detection method, particularly in the DAB-mapped image 810.

Figure 5:
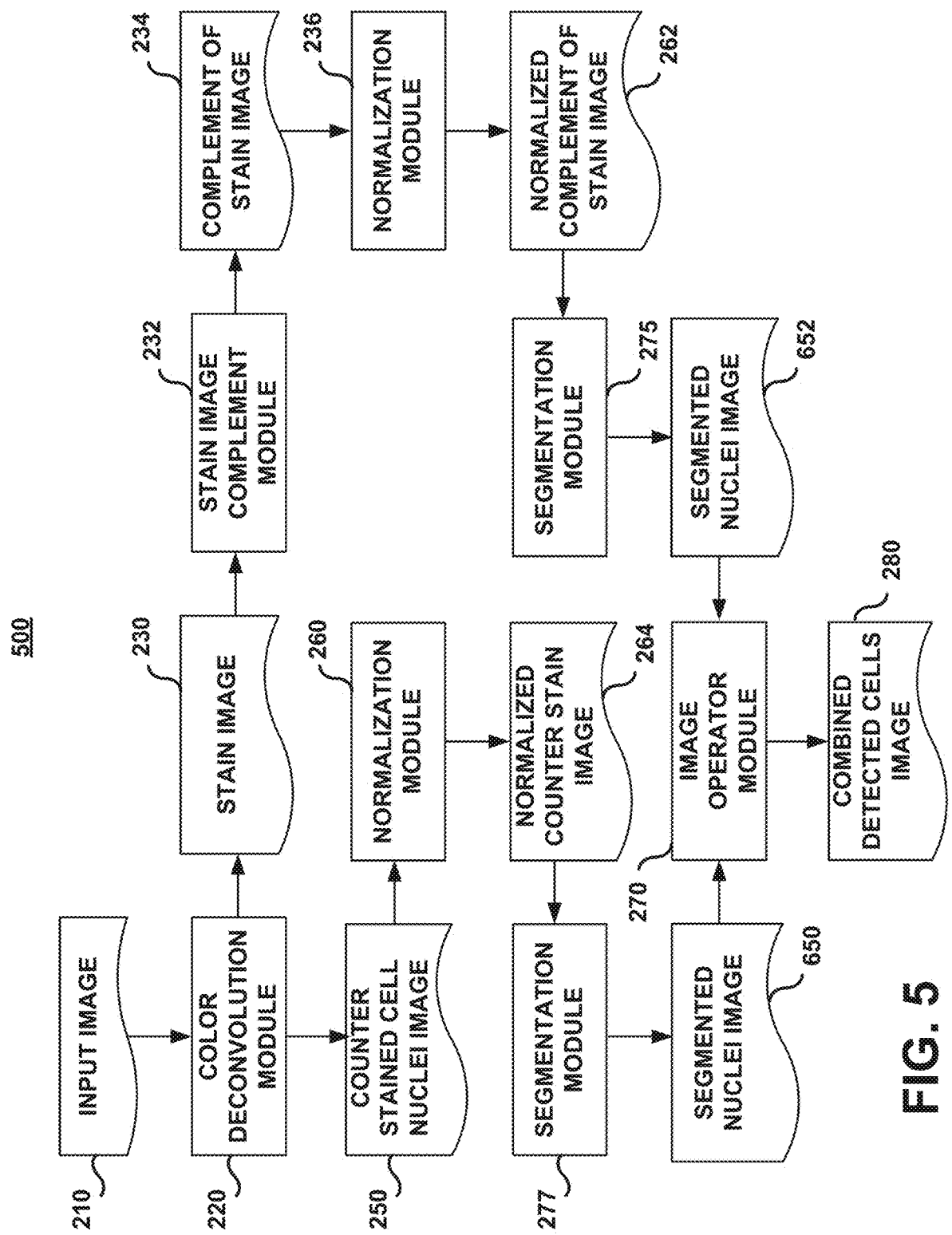
FIG. 5 is a block diagram of an alternative cell detection engine that forms part of the cellular detection system of FIG. 1, in accordance with an exemplary, alternative embodiment of the subject disclosure.
Figure 6:
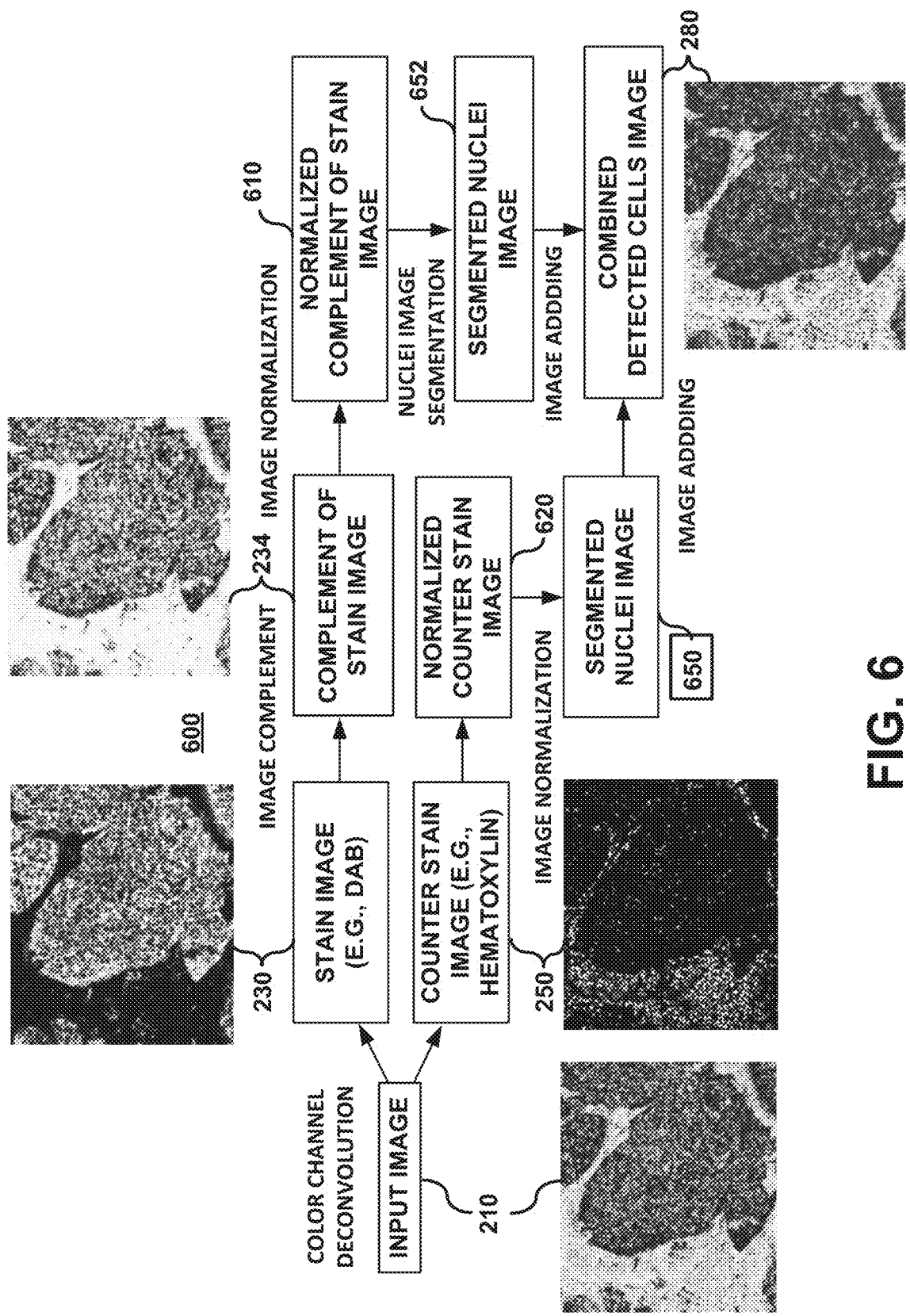
FIG. 6 depicts a workflow implemented by the alternative cell detection engine of FIG. 5, wherein the images generated by cell detection engine are optionally normalized, segmented, and then combined, in accordance with an exemplary embodiment of the subject disclosure.
Figure 7:
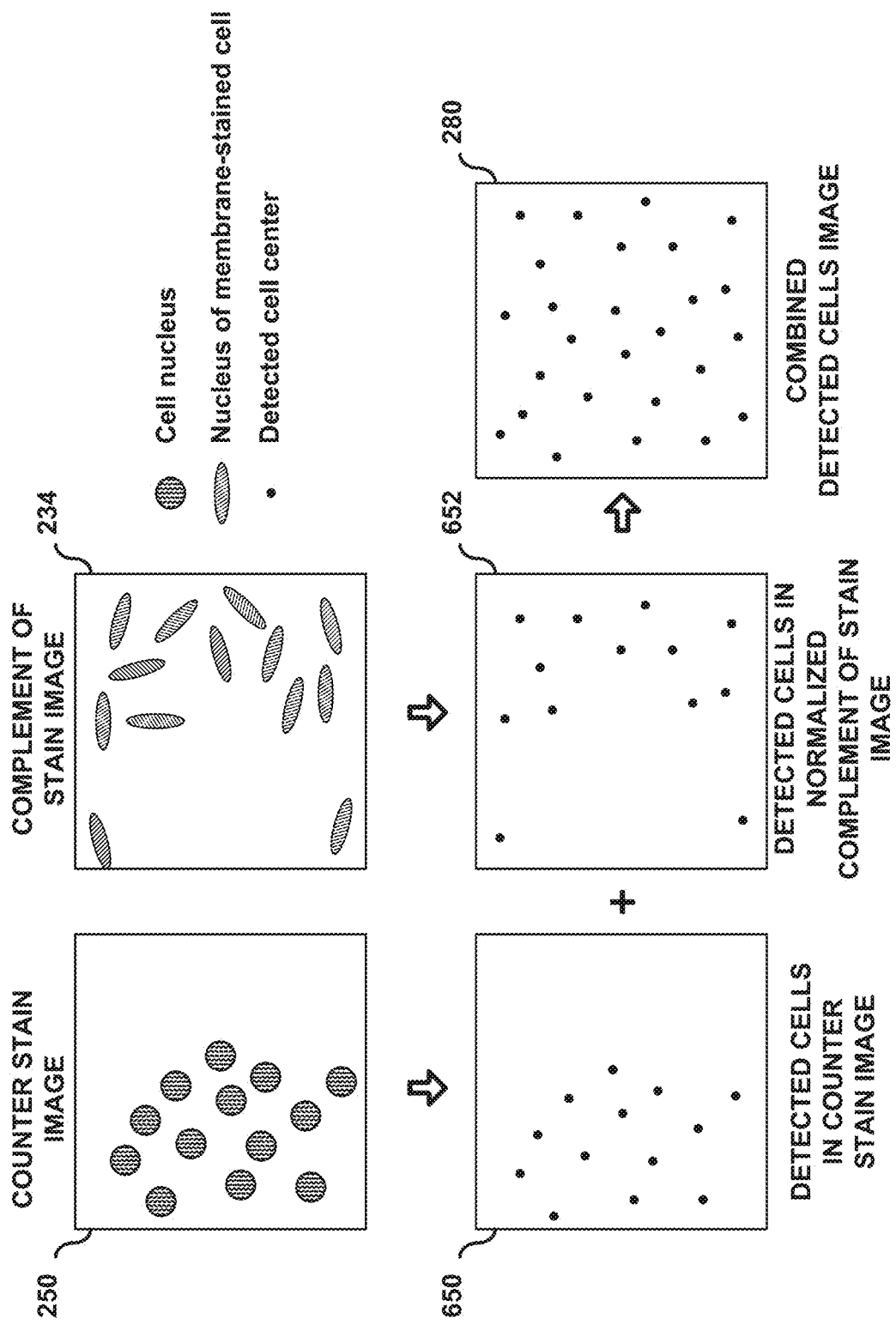
FIG. 7 depicts schematic illustrations of cellular distributions in a counter stain image and in a complement of a membrane stain image shown in FIGS. 5 and 6, in accordance with an exemplary embodiment of the subject disclosure.

Considering now FIGS. 5, 6, and 7, FIG. 5 illustrates a cell detection engine 500 that forms part of image analysis system 100. FIG. 6 illustrates a workflow 600 implemented by cell detection engine 500, as follows: input image 210 may be deconvolved in two separate channels: a brown channel that may generate a membrane stain image 230; and a blue channel that may generate a counter stain image 250. A stain image complement module 232 may generate a complement membrane stain image (brown) 234.

A normalization module 236 may optionally be implemented onto the complement image 234 to generate a normalized complement 262 of membrane stain image 230. Another normalization module 260 (or the same normalization module 236) may optionally normalize the counter stained cell nuclei image 250 into a normalized counter stain image 264.

Thereafter, a segmentation module 275 may segment the normalized complement membrane stain image 262 and generate a segmented nuclei image 652 therefrom, so that the nuclei in the brown stain image 230 are detected. Concurrently, another segmentation module 277 (or the same segmentation module 275) may segment the normalized counter stain image (blue) 264 and generate a segmented nuclei image 650 therefrom, so that the nuclei in the blue counterstain image 250 are detected. An image operator module 270 may then combine the two segmented nuclei images 650, 652 into a final detection result image 280 (FIGS. 5, 6, 7, 9).

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a," "b." c," "first," "second," and "third," are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving an image depicting a specimen;
   deconvolving the image into at least a first information channel and a second information channel;
   generating a stain image along the first information channel;
   generating a complement of the stain image;
   generating a counter stain image along the second information channel;
   combining the complement of the stain image and the counter stain image to generate a combined image;
   processing the combined image using a segmentation operation to detect a plurality of image objects in the combined image, each of the plurality of image objects corresponding to a cell nucleus of the specimen; and outputting the combined image with the detected plurality of image objects.

2. The method of claim 1, wherein the first information channel includes a first color channel.

3. The method of claim 2, wherein the second information channel includes a second color channel, wherein the second color channel is different from the first color channel.

4. The method of claim 1, wherein the first information channel indicates an immunohistochemistry (IHC) stain.

5. The method of claim 1, wherein the second information channel indicates a counterstain.

6. The method of claim 1, further comprising:
normalizing the complement of the stain image to generate a normalized complement of the stain image; and
combining the normalized complement of the stain image and the counter stain image to generate the combined image.

7. The method of claim 6, further comprising:
normalizing the counter stain image to generate a normalized counter stain image; and
combining the normalized complement of the stain image and the normalized counter stain image to generate the combined image.

8. An image analysis system comprising one or more processors and coupled to at least one memory storing instructions which, when executed by the one or more processors, cause the tissue analysis system to perform the operations of:
deconvolving a specimen image into at least a first information channel and a second information channel;
generating a stain image along the first information channel;
generating a counter stain image along the second information channel;
generating a complement of the stain image;
process the complement of the stain image using a segmentation operation to generate a first segmented nuclei image, wherein the first segmented nuclei image indicates a first set of image objects in the specimen image that correspond to a first set of nuclei;
process the counter stain image using the segmentation operation to generate a second segmented nuclei image, wherein the second segmented nuclei image indicates a second set of image objects in the specimen that correspond to a second set of nuclei; and
combining the first and second segmented nuclei images to generate a combined segmented nuclei image, wherein the combined segment nuclei image indicates bot the first and second set of image objects.

9. The image analysis system of claim 8, wherein the instructions further cause the image analysis system to perform the operations of:
normalizing the complement of the stain image to generate a normalized complement of the stain image; and
processing the normalized complement of the stain image using the segmentation operation to generate a first normalized segmented nuclei image, wherein combining the first and second segmented nuclei images comprises combining the first normalized segmented nuclei image and the second segmented nuclei image.

10. The image analysis system of claim 9, wherein the instructions further cause the image analysis system to perform the operations of:

normalizing the counter stain image to generate a normalized counter stain image; and
processing the normalized counter stain image using the segmentation operation to generate a second normalized segmented nuclei image, wherein combining the first normalized segmented nuclei image and the second segmented nuclei image comprises combining the first and second normalized segmented nuclei images.

11. The image analysis system of claim 8, wherein the first information channel includes a first color channel.

12. The image analysis system of claim 11, wherein the second information channel includes a second color channel, wherein the second color channel is different from the first color channel.

13. The image analysis system of claim 8, wherein the first information channel indicates an immunohistochemistry (IHC) stain.

14. The image analysis system of claim 8, wherein the second information channel indicates a counterstain.

15. A non-transitory computer-readable medium including instructions which, when executed by one or more processors of an image analysis system, cause the image analysis system to perform a plurality of operations for detecting nuclei in a specimen image, the operations comprising:
deconvolving the specimen image into at least a first information channel and a second information channel;
generating a stain image along the first information channel;
generating a complement of the stain image;
generating a counter stain image along the second information channel;
combining the complement of the stain image and the counter stain image to generate a combined image;
processing the combined image using a segmentation operation to detect a plurality of image objects in the combined image, each of the plurality of image objects corresponding to a cell nucleus of the specimen; and
outputting the combined image with the detected plurality of image objects.

16. The non-transitory computer-readable medium of claim 15, wherein the operations further comprise:
normalizing the complement of the stain image to generate a normalized complement of the stain image; and
combining the normalized complement of the stain image and the counter stain image to generate the combined image.

17. The non-transitory computer-readable medium of claim 16, wherein the operations further comprise:
normalizing the counter stain image to generate a normalized counter stain image; and
combining the normalized complement of the stain image and the normalized counter stain image to generate the combined image.

18. The non-transitory computer-readable medium of claim 15, wherein the first information channel includes a first color channel.

19. The non-transitory computer-readable medium of claim 15, wherein the first information channel indicates an immunohistochemistry (IHC) stain.

20. The non-transitory computer-readable medium of claim 15, wherein the second information channel indicates a counterstain.

* * * * *